United States Patent [19]

Labauze

[11] Patent Number: 5,821,290
[45] Date of Patent: Oct. 13, 1998

[54] SILYLATED RUBBER DIENE POLYMER CONTAINING ORGANOSILANE

[75] Inventor: Gérard Labauze, Clermont-Ferrand, France

[73] Assignee: Compagnie Generale des Etablissements Micheline—Michelin & Cie

[21] Appl. No.: 643,073

[22] Filed: Apr. 30, 1996

[30] Foreign Application Priority Data

Oct. 4, 1995 [FR] France .................................. 95 11762

[51] Int. Cl.⁶ ...................................................... C08K 5/54
[52] U.S. Cl. ............................ 524/188; 524/100; 524/95; 524/496
[58] Field of Search .................... 524/493, 495, 524/506, 188, 496, 100, 95

[56] References Cited

U.S. PATENT DOCUMENTS

| | | |
|---|---|---|
| 3,135,716 | 6/1964 | Uraneck et al. . |
| 3,244,644 | 4/1966 | Stiles . |
| 3,281,383 | 10/1966 | Zelinski et al. . |
| 3,595,830 | 7/1971 | Owen et al. ............................. 524/188 |
| 3,773,732 | 11/1973 | Dillenschneider . |
| 4,185,042 | 1/1980 | Verkouw .................................. 525/332 |
| 4,550,142 | 10/1985 | Akitn et al. ............................. 525/236 |
| 4,820,751 | 4/1989 | Takeshita et al. ....................... 523/215 |
| 5,017,636 | 5/1991 | Hattori et al. .......................... 525/343 |
| 5,066,721 | 11/1991 | Hamada et al. ......................... 525/102 |
| 5,159,009 | 10/1992 | Wolff et al. ............................. 542/495 |
| 5,227,425 | 7/1993 | Rainline ................................... 524/493 |
| 5,401,789 | 3/1995 | Wolff et al. ............................. 524/188 |
| 5,409,969 | 4/1995 | Hamada ................................... 523/213 |
| 5,496,883 | 3/1996 | Hamada ................................... 524/492 |
| 5,508,333 | 4/1996 | Shimizu et al. ......................... 525/105 |

*Primary Examiner*—Veronica P. Hoke
*Attorney, Agent, or Firm*—Baker & Botts, LLP

[57] ABSTRACT

The present invention relates to a rubber composition reinforced by carbon black and possibly silica, including at least one diene polymer functionalized or modified by an alkoxysilane derivative and at least one organosilane compound having a primary or secondary amine function or an imine function, which can be used for the manufacture of tires having, in particular, improved hysteresis properties.

21 Claims, No Drawings

SILYLATED RUBBER DIENE POLYMER CONTAINING ORGANOSILANE

BACKGROUND OF THE INVENTION

The present invention relates to a sulfur-vulcanizable rubber composition, having improved hysteresis properties in vulcanized state, comprising an alkoxysilane functionalized diene polymer and carbon black or carbon black and silica as reinforcing filler, which can be used, in particular, for the manufacture of tires.

Since a saving of fuel and the need to protect the environment have become priorities, it is desirable to produce polymers which have good mechanical properties and a hysteresis as small as possible in order to be able to use them in the form of rubber compositions which can be used for the manufacture of various semifinished products entering into the constitution of tires, such as, for instance, sub-layers, connecting layers between rubbers of different kinds, and calendering rubbers of metal or textile reinforcements, sidewall rubbers or treads and to obtain tires having improved properties, and particularly having reduced resistance to rolling.

In order to achieve this goal, numerous solutions have been proposed consisting, in particular, in modifying the nature of the diene polymers and copolymers at the end of polymerization by means of coupling or starring or functionalizing agents. The vast majority of these solutions are concentrated essentially on the use of polymers modified with carbon black as reinforcing filler in order to obtain good interaction between the modified polymer and the carbon black, the use of reinforcing white fillers, particularly silica, having proved for a long time inappropriate as a result of the low value of certain properties of such compositions and therefore of certain properties of tires employing these compositions. By way of illustrative examples of this prior art, we may cite U.S. Pat. No. 4,550,142, which describes a rubber composition having a base of carbon black and of a diene polymer functionalized by means of a derivative of benzophenone, having improved hysteresis properties; U.S. Pat. No. 5,159,009, which describes the use of carbon black modified by polysulfur alkoxysilane derivatives in compositions having a base of diene polymers; U.S. Pat. No. 4,820,751, which describes a rubber composition which can be used in the manufacture of tires, comprising a special carbon black used with a silane coupling agent and which can be used with a minority amount of silica when said composition is intended to form a tread. Finally, EP Pat. Application A1-0 519 188, which describes a composition intended to constitute a tire tread having a base of a diene rubber and a carbon black modified by the incorporation of organic compounds of silicon which are specific to the master mix.

Several solutions have been proposed concerning the use of silica as reinforcing filler in compositions intended to constitute tire treads. By way of example of such prior art, mention may be made of EP Pat. Application A-0 299 074 which describes a diene rubber composition filled with silica having a base of diene polymer functionalized by means of a silane having a non-hydrolyzable alkoxy radical and of EP Pat. Application A-0 447 066, which describes a silica-filled composition containing a diene polymer functionalized by means of a halogenated silane compound. Despite the improvement in the properties obtained by the use of such functionalized polymers, the silica compositions described in said prior art have not met expectations for use in tire treads since the properties exhibited, although improved, nevertheless remain insufficient as compared with the level required.

SUMMARY OF THE INVENTION

The object of the present invention is diene rubber compositions which contain carbon black or carbon black and silica as reinforcing filler, which can be used in the manufacture of tires, particularly treads, having improved hysteresis properties.

Another object of the present invention is a process for substantially reducing the hysteresis of diene rubber compositions which can be used in the manufacture of tires, particularly treads, without penalizing the other properties.

Another object of the invention is tire treads and tires having reduced resistance to rolling.

The applicant has surprisingly discovered that it is possible, without affecting the other properties, greatly to decrease the hysteresis of diene rubber compositions which can be used in the manufacture of tires, particularly treads, comprising carbon black or a mixture of carbon black and silica as reinforcing filler by the use of at least one diene polymer functionalized or modified by means of an alkoxysilane derivative, with at least one organosilane compound having one or more amine or imine functions.

The invention concerns a sulfur-vulcanizable rubber composition comprising at least one functionalized or modified diene polymer and carbon black or a mixture of carbon black and silica as reinforcing filler, characterized by the fact that the functionalized or modified diene polymer is an alkoxysilane functionalized polymer or a polymer modified by an alkoxysilane derivative and by the fact that it furthermore comprises at least one organosilane compound containing one or more amine or imine functions of general formula I:

$$Z-R^1-Si(OR^2)_{3-n}(R^3)_n$$

in which:

Z represents a primary amine function, a secondary amine function, whether cyclic or not, or an imine function or a polyamine radical. $R^1$, $R^2$, and $R^3$, which may be identical or different, represent an alkyl, aryl, alkaryl or aralkyl radical having from 1 to 12 carbon atoms and preferably 1 to 4 carbon atoms.

n is a whole number selected from the values of 0, 1 and 2.

All diene polymers functionalized or modified by an alkoxysilane compound are suitable, but polymers of the general formula II $$(Y)-R^5-Si(OR^4)_2-P$$

are preferred, in which formula:

Y represents a halogen or alkyl, epoxy, glycidyloxy, vinyl, allyl radical; $R^5$ and $R^4$, which are identical or different, represent an alkyl, aryl, alkylaryl or aralkyl radical having from 1 to 12 carbon atoms; and P represents the chain of a diene polymer selected from the group represented by any homopolymer obtained by polymerization of a conjugated diene monomer having from 4 to 12 carbon atoms, any copolymer obtained by copolymerization of one or more dienes conjugated with each other or with one or more aromatic vinyl compounds having from 8 to 20 carbon atoms. By way of conjugated dienes there are suitable, in particular, butadiene-1,3, 2-methyl-1,3-butadiene, 2,3-di($C_1$ to $C_5$ alkyl)-1,3-butadiene, such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene, etc.

By way of aromatic vinyl compounds there are suitable in particular styrene, ortho- meta- and para-methyl styrene, the commercial "vinyl-toluene" mixture, paratertiobutylstyrene, the methoxy-styrenes, the chlorostyrenes, vinyl mesitylene, divinyl benzene, vinyl naphthalene, etc. The copolymers may contain between 99% and 20% by weight diene units and 1% to 80% by weight aromatic vinyl units.

The diene polymers functionalized or modified by an alkoxysilane compound may have any microstructure which is a function of the polymerization conditions used. The polymers may be block, statistical, sequenced or micro-sequenced polymers, etc., and be prepared by bulk, emulsion, dispersion or solution polymerization. In the case an anionic polymerization, the microstructure of these polymers can be determined by the presence or absence of a modifying or randomizing agent and the amounts of modifying and/or randomizing agent used.

Preferably there are suitable polybutadienes, in particular those having a content of 1,2 units of between 4% and 80%, or those having a content of 1,4-cis units of more than 80%, polyisoprenes, butadiene-styrene copolymers, in particular those having a styrene content of between 5 and 50% by weight, and more particularly between 20% and 40% by weight, a content of 1,2-bonds of the butadiene portion of between 4% and 65%, and a content of trans-1,4 bonds of between 30% and 80%. In the case of butadiene-styrene-isoprene copolymers there are suitable those having a styrene content of between 5 and 50% by weight, and more particularly between 10% and 40%, an isoprene content of between 15% and 60% by weight, and more particularly between 20% and 50% by weight, a butadiene content of between 5 and 50% by weight, and more particularly between 20% and 40% by weight, a content of 1,2 units of the butadiene portion of between 4% and 80%, a content of 1,4-trans units of the butadiene portion of between 6% and 80%, a content of 1,2 plus 3,4 units of the isoprene portion of between 5% and 70%, and a content of 1,4-trans units of the isoprene portion of between 10% and 50%.

The diene polymers functionalized or modified by an alkoxysilane derivative are obtained in known manner by polymerization or copolymerization of the monomer or monomers in the presence of an anionic or non-anionic, mono-functional or poly-functional initiator in order to obtain a live or non-live polymer, which is followed either by the functionalization reaction with an alkoxysilane compound as described, for instance, in U.S. Pat. No. 3,244,664 or in French Patent Application 94/08887, the contents of which are incorporated herein, or by the modification reaction, as described for instance in French Patent Application A1-2 340 323.

By way of non-limitative examples of organosilane compounds of formula I, mention may be made of aminopropyltrimethoxysilane, aminopropyltriethoxysilane, aminopropylmethyldimethoxysilane, aminopropyldimethylmethoxysilane, methylaminopropyltrimethoxysilane, dimethylaminopropyltrimethoxysilane, methylaminopropyltrimethoxysilane, methylaminopropyltriethoxysilane, dimethylpropyltriethoxysilane, piperidinopropyltrimethoxysilane, imidazolinopropyltrimethoxysilane, aminoethylaminopropyltrimethoxysilane, pyrrolidinopropyltrimethoxysilane, piperazinopropyltrimethoxysilane, morpholinopropyltrimethoxysilane, pyrazolinopropyltrimethoxysilane, trizaolinopropyltrimethoxysilane, benzylidene propylaminotrimethoxysilane. These organosilane compounds of formula I can be used in quantities varying from 0.1 to 10 parts by weight to 100 parts of functionalized polymers.

As carbon blacks which can be used in the rubber compositions of the invention, there are suitable all carbon blacks, whether or not modified by oxidation or any other chemical treatment, and in particular all carbon blacks which are available commercially or are conventionally used in tires, and in particular in the treads or tires. By way of non-limitative examples of such carbon blacks, mention may be made of blacks N234, N339, N326, N375, etc. The carbon black may represent the entire reinforcing filler, but it may also be used blended with a white filler, in particular with silica. All silicas are suitable and there may be concerned either conventional silicas or highly dispersible precipitated silicas, the latter being, however, preferred.

By highly dispersible silica there is understood any silica capable of disaggregation and dispersion in a very large polymer matrix which can be observed by electronic or optical microscopy on fine sections. As non-limitative examples of such preferred highly dispersible polymers, mention may be made of those having a CTAB surface area of 450 $m^2/g$ or less and particularly those described in European Patent Applications A-0 157 703 and A-0-520 862, the contents of which are incorporated herein, or the silica Perkasil KS 340 of the Akzo company, the silica Zeosil 1165 MP of Rhone-Poulenc, the silica Hi-Sil 2000 of PPG, the silicas Zeopol 8741 and Zeopol 8745 of Huber. There are more particularly suitable silicas having a specific CTAB area between 100 and 300 $m^2/g$, both inclusive, and a BET specific surface area of between 100 and 300 $m^2/g$, both inclusive, and more preferably those having a ratio of BET specific area to CTAB specific area of between 1.0 and 1.2, both inclusive, their other additional properties being of little importance such as, for instance, the oil absorption, the porosity and the pore distribution, the average diameter, the average projected area of the aggregates, etc. and the physical state in which the silica is present, for instance, microballs, granules, powder, etc. Of course, by silica there are also understood blends of different silicas. The silica may be used alone or in the presence of other white fillers. The CTAB specific surface area is determined by NFT Method 45007 of November 1987. The BET specific surface area is determined by the method of BRUNAUER, EMMET and TELLER described in the Journal of the American Chemical Society, Vol. 80, page 309 (1938), corresponding to NFT Standard 45007 of November 1987.

The content of filler may vary from 30 to 100 parts of alkoxysilane functionalized or modified polymer. The proportion of silica in the filler blend may vary from 1 to 200 parts by weight to 100 parts of carbon black. The silica may represent 1% to 70% by weight of the total reinforcing filler. The rubber compositions in accordance with the invention may comprise exclusively one or more alkoxysilane functionalized or modified diene polymers as elastomer. However, the alkoxysilane functionalized or modified diene polymer or polymers may also be used blended in a blend in composition in accordance with the invention with any other conventional diene elastomer, and in particular with any other elastomer conventionally used in tire treads. By way of non-limitative illustration of such conventional elastomers, mention may be made of natural rubber, the non-functionalized diene polymers corresponding to the P chains of functionalized polymers of formula II or these same polymers, but coupled or branched or functionalized with functionalizing agents other than alkoxysilane agents, such as, for instance, derivatives of tin or benzophenone, such as described for example in U.S. Pat. Nos. 3,393,182, 3,956,232, 4,026,865, 4,550,142 and 5,001,196.

When the conventional elastomer used in blending is natural rubber or one or more non-functionalized diene polymers such as, for instance, polybutadienes, polyisoprenes, butadiene-styrene or butadiene-styrene-isoprene copolymers, this elastomer may be present in an amount of between 1 and 70 parts by weight to 100 parts of alkoxysilane functionalized or modified diene polymer. When the conventional elastomer used in blending is a polymer functionalized with a functionalizing agent other than an alkoxysilane compound of formula I, this elastomer may be present in an amount of 1 to 100 parts by weight to 100 parts by weight of alkoxysilane functionalized or modified polymer.

The compositions in accordance with the invention can obviously also contain the other components and additives customarily used in rubber mixes, such as plasticizers, pigments, antioxidants, sulfur, vulcanization accelerators, lengthening oils, one or more silica coupling and/or bonding agents, and/or one or more silica covering agents such as polyols, amines, alkoxysilanes, etc.

Another object of the present invention is a new process for the preparation of diene rubber compositions comprising as reinforcing filler carbon black or a mixture of carbon black and silica, characterized by the fact that at least one organosilane compound having an amine or imine function of general formula I is incorporated by thermo-mechanical working in an elastomer comprising at least one diene polymer functionalized or modified by an alkoxysilane derivative.

The incorporating of the organosilane of general formula I is effected in any suitable device, for instance an internal mixture or in an extruder in known manner.

In accordance with a first method, the elastomer or the blend comprising at least one alkoxysilane functionalized or modified diene polymer is subjected to a first thermo-mechanical working phase, after which the organosilane of formula I is added to the elastomer and the two components are mixed in a second phase, whereupon the carbon black and the other components customarily employed in rubber compositions intended for the manufacture of tires, with the exception of the vulcanization system, are added and the thermo-mechanical working is continued for a suitable period of time.

In accordance with a second method, the elastomer comprising at least one diene polymer functionalized or modified by an alkoxysilane derivative and the organosilane of formula I are subjected to a first phase of thermo-mechanical working, after which the carbon black and the other components customarily employed in the rubber compositions intended for the manufacture of tires are added, with the exception of the vulcanization system, and the thermo-mechanical working is continued for a suitable period of time.

In accordance with a third method, the elastomer comprising at least one diene polymer functionalized or modified by an alkoxysilane derivative, the organosilane of formula I and the carbon black are subjected to a first phase of thermo-mechanical working, after which the other components customarily employed in rubber compositions intended for the manufacture of tire are added, with the is exception of the vulcanization system, and the thermo-mechanical working is continued for a suitable period of time.

In the event that both carbon black and silica are used as reinforcing filler, one effects thermo-mechanical working, in succession, of the functionalized or modified elastomer, of the organosilane agent of formula I, of the silica, and of the bonding agent, whereupon the carbon black is incorporated. The thermo-mechanical working is in this case preferably carried out in two thermal steps separated by a cooling step at a temperature below 100° C., as described in EP Patent Application A-0 501 227.

To the mixture obtained in accordance with any of the embodiments, the vulcanization system is finally added, as known per se, in a finishing step before proceeding with the vulcanization of the composition.

DESCRIPTION OF PREFERRED EMBODIMENTS

The invention is indicated by way of illustration, but not of limitation, by the examples, which do not constitute a limiting of the scope of the invention.

In the examples, the properties of the compositions are evaluated as follows:

Shore A hardness: Measurements carried out in accordance with DIN Standard 53505.

Mooney viscosity: ML (1+4) at 100° C., measured in accordance with ASTM Standard D 1646.

Modulus of elongation at 300% (ME 300), 100% (ME 100) and 10% (ME 10): measurements carried out in accordance with ISO Standard 37.

Scott break indices: Measured at 20° C., Rupture force (RF) in MPa.

Elongation upon rupture (ER) in %.

Hysteresis losses (HL): Measured by rebound at 60° C. in %.

Dynamic properties in shear:

Measurements as a function of the deformation: Carried out at 10 Hertz with a peak-peak deformation ranging from 0.15% to 50%. The non-linearity expressed in MPa is the difference in shear modulus between 0.15% and 50% deformation. The hysteresis is expressed by the measurement of tan δ at 7% deformation and at 23° C. in accordance with ASTM Standard D2231-71 (again approved in 1977).

EXAMPLE 1

This control example is for the purpose of comparing the properties of two compositions having a base of polymers functionalized with two different alkoxysilanes with two compositions having a base of the same polymers but one non-functionalized and the other functionalized with a functionalizing agent known in the prior art as producing interesting hysteresis properties in the tires of compositions reinforced with carbon black.

In all the tests of this example, the diene polymer is a butadiene-styrene copolymer having an incorporated styrene content of 26% and a content of 1,2 bonds for the butadiene portion of 41%.

For Test A, the butadiene-styrene copolymer (SBRA) used in the composition is a copolymer functionalized with propyltrimethoxysilane (PTSI).

For Test B, the butadiene-styrene copolymer (SBRB) used in the composition is a copolymer functionalized with glycidyloxypropyltrimethoxysilane (GPTSI), sold by the Huls company under the trade name DYNASYLAN GLYMO, prepared by the process described in French Patent Application 94/08887.

For Test C, the butadiene-styrene copolymer (SBRC) used in the composition is a copolymer functionalized with n-Bu$_3$SnCl as described in U.S. Pat. Nos. 3,956,232 and 4,026,865.

For Test D, the copolymer (SBRD) used in the composition is a non-functionalized copolymer stopped at the end of copolymerization by means of methanol.

For all tests, the copolymer is prepared in a reactor of a useful capacity of 32 liters with agitator of turbine type, into which there are continuously introduced toluene, butadiene, styrene and THF in a mass ratio of 100: 10:4.3:0.3, and a solution of 1030 micromoles of active n-BuLi to 100 g of monomer. The rates of flow of the different solutions are calculated so as to have an average time of stay of 45 minutes with strong agitation. The temperature is maintained constant at 60° C. At the outlet of the reactor, the conversion measured is 88%. The copolymer is then either stopped with methanol or functionalized during a subsequent step.

The copolymers used in compositions A and B are functionalized as described below.

At the outlet of the reactor, the functionalizing agent is added to the polymer at the inlet, either of a conventional static mixture comprising 26 elements and a volume of 250 ml in the case of PTSI, or at the inlet of a dynamic mixer of 250 ml provided with an agitator adjusted to a speed of rotation of 3100 rpm in the case of GPTSI. The PTSI and GPTSI are added in an amount such that the molar ratio of functionalizing agent to the number of active sites of the initiator is equal to 1.5 in the case of PTSI and to 2.0 in the case of GPTSI. The functionalizing reaction is carried out at 60° C. Three minutes after the addition of the functionalizing agent, 0.5 part to hundred parts of elastomer 4,4'-methylene-bis-2,6-ditertiobutyl phenol is added as antioxidizing agent. Each of the functionalized copolymers is recovered by the conventional operation of steam stripping of the solvent and then dried in the oven at 50° C.

By means of the four copolymers SBRA, B, C, and D, there are prepared, as known per se, four rubber compositions reinforced exclusively by carbon black in accordance with the following formula in which all parts are expressed by weight:

| | |
|---|---|
| Elastomer: | 100 |
| Black N 234: | 50 |
| Aromatic oil: | 5 |
| Zinc oxide: | 2.5 |
| Stearic acid: | 1.5 |
| Antioxidant (a): | 1.9 |
| Paraffin (b): | 1.5 |
| Sulfur: | 1.4 |
| Sulfenamide (c): | 1.4 |
| (a): Antioxidant: | N-(1,3-dimethyl-butyl)-N'-phenyl-p-phenylenediamine |
| (b) : Paraffin: | Mixture of macro and microcrystalline waxes |
| (c): Sulfenamide: | N-cyclohexyl-2-benzothiazyl sulfenamide |

The compositions are produced in a single step in order to obtain a mixture in an internal mixer which is 70% filled, the temperature of the tank of which is 60° C., and the average speed of the blades 45 rpm.

The elastomer is introduced into the tank, and then after a suitable period of mixing, all the other components of the formulation, with the exception of the vulcanization system, are added, and the thermo-mechanical mixing work is continued until the temperature has reached 180° C. The mixture is recovered, whereupon the sulfur and the sulfenamide constituting the vulcanization system are added on homo-finisher at 30° C.

The vulcanization is effected at 1500° C. for 40 minutes. The properties of the 4 compositions are compared with each other, both in vulcanized state and in non-vulcanized state.

The results are set forth in Table I:

TABLE I

| Compositions | SBRA | SBRB | SBRC | SBRD |
|---|---|---|---|---|
| Properties in non-vulcanized state | | | | |
| Mooney | 70 | 76 | 89 | 68 |
| Properties in vulcanized state | | | | |
| Shore hardness | 69.0 | 69.5 | 64.5 | 67.5 |
| ME 10 | 6.0 | 6.0 | 4.7 | 5.8 |
| ME 100 | 2.30 | 2.30 | 1.86 | 2.08 |
| ME 300 | 2.90 | 2.95 | 2.75 | 2.57 |
| ME 300/ME 100 | 1.27 | 1.27 | 1.48 | 1.24 |
| Scott breakage indices at | | | | |
| 20° C. RF | 24 | 24 | 25 | 23 |
| 20° C. ER% | 450 | 450 | 430 | 480 |
| HL at 60° C.* | 35 | 34 | 29 | 37 |
| Dynamic properties as a function of the deformation | | | | |
| ΔG at 23° C. | 2.30 | 2.30 | 0.95 | 2.50 |
| tan δ at 23° C. | 0.25 | 0.25 | 0.19 | 0.27 |

(*)the deformation for this measurement of hysteresis loss is 38%.

On the basis of the properties in raw and vulcanized state, it is noted that compositions A and B having a base of alkoxysilane functionalized polymers have properties which are slightly improved as compared with those exhibited by composition D but far poorer than those exhibited by composition C, in particular with regard to the hysteresis properties with slight and extensive deformations.

EXAMPLE 2

The purpose of this example is to show the improvement in the properties of the compositions in accordance with the invention.

With the four copolymers used in Example 1, there are produced four compositions which differ from the preceding ones solely by the addition to the elastomer of an organosilane agent of general formula I, which in the present case is aminopropyltrimethoxysilane (APTSI) of the formula $H_2N\text{---}(CH_2)_3\text{---}Si(OCH_3)_3$.

The compositions are compared by the first method described above. The addition of one part by weight of organosilane to 100 parts by weight of elastomer is carried out 20 seconds after the start of the thermo-mechanical mixing operation.

The properties of the compositions obtained are set forth in Table II.

TABLE II

| Compositions | SBRA | SBRB | SBRC | SBRD |
|---|---|---|---|---|
| Properties in non-vulcanized state | | | | |
| Mooney | 90 | 94 | 85 | 65 |
| Properties in vulcanized state | | | | |
| Shore hardness | 65.0 | 64.5 | 65 | 68.5 |
| ME 10 | 5.00 | 5.00 | 4.90 | 6.00 |
| ME 100 | 2.10 | 2.08 | 1.96 | 2.10 |
| ME 300 | 2.90 | 2.95 | 2.76 | 2.50 |
| ME 300/ME 100 | 1.38 | 1.42 | 1.41 | 1.19 |
| Scott breakage indices at | | | | |
| 20° C. RF | 25 | 26 | 25 | 22 |
| 20° C. ER-00 | 400 | 400 | 430 | 500 |
| HL at 60° C.* | 30 | 29 | 29 | 38 |

TABLE II-continued

| Compositions | SBRA | SBRB | SBRC | SBRD |
|---|---|---|---|---|
| Dynamic properties as a function of the deformation | | | | |
| $\Delta G$ at 23° C. | 1.10 | 1.00 | 1.00 | 2.70 |
| tan $\delta$ at 23° C. | 0.19 | 0.18 | 0.19 | 0.29 |

(*)the deformation for this measurement of hysteresis loss is 38%.

On the basis of the properties in vulcanized state, it is noted that the addition to the internal mixture of aminopropyltrimethoxysilane confers upon the compositions using the alkoxysilane functionalized SBR A and B improved reinforcement properties and greatly improved hysteresis properties as compared with those of composition D using the methanol-stopped SBRD, and of the same level as those obtained with composition C using the n-Bu₃SnCl functionalized SBRC.

It is also noted that while the addition of aminopropyltrimethoxysilane greatly improves the properties of the SBR A and B compositions, it has no effect, if not a negative one, on the properties of the compositions SBR C and D in this type of mixture having a base of carbon black.

EXAMPLE 3

The object of this example is to show that the improvement in the properties is also obtained when the reinforcing filler is not formed exclusively of carbon black but is formed of a blend of carbon black and silica. Four compositions having the following formula are prepared with the four polymers used in Example 1:

| | |
|---|---|
| Elastomer: | 100 |
| APTSI: | 1 |
| Silica(*): | 30 |
| Black N 234: | 30 |
| Aromatic oil: | 15 |
| Bonding agent(**): | 2.4 |
| Zinc oxide: | 2.5 |
| Stearic acid: | 1.5 |
| Antioxidant (a): | 1.9 |
| Paraffin (b): | 1.5 |
| Sulfur: | 1.1 |
| Sulfenamide (c): | 2 |
| Diphenylguanidine: | 1.5 |

(*) the silica is a highly dispersible silica in the form of microbeads, marketed by Rhône-Poulenc under the commercial name Zeosil 1165 MP.
(**) polysulfur organosilane marketed by Degussa under the designation SI69.
(a): Antioxidant: N-(1,3-dimethyl-butyl)-N'-phenyl-p-phenylenediamine
(b): Paraffin: Mixture of macro and microcrystalline waxes
(c): Sulfenamide: N-cyclohexyl-2-benzothiazyl sulfenamide The obtaining of the compositions is effected, in a preferred embodiment, in two thermo-mechanical steps separated by a cooling phase. The first step is carried out in an internal mixer with the same conditions of filling coefficient, temperature and speed of the palettes as those indicated in Example 1. The organosilane, in the present case APTSI, is added as in the preceding example to the elastomer 20 seconds after the start of the mixing of the elastomer, and then one minute after the addition of the APTSI; the silica, the bonding agent, and the oil are added, whereupon a minute later the carbon black is added followed by the stearic acid and the paraffin. The thermo-mechanical working is continued until reaching a temperature close to 160° C., whereupon the elastomeric block is recovered and cooled.

The second step is always carried out in the same internal mixer with the conditions of temperature and speed of the palettes unchanged. The elastomeric block is subjected to thermo-mechanical working for a period of time suitable to bring the temperature to about 100° C.; the zinc oxide and the antioxidant are then added, whereupon the thermo-mechanical working is continued until reaching a temperature close to 160° C., and the mixture is recovered.

The three components constituting the vulcanization system are incorporated, as known per se, in this mixture during a finishing stage.

The vulcanization is carried out as in the other examples for 40 minutes at 150° C.

The properties of the four compositions are set forth in Table III and the first three are compared with three control compositions (SBRA/T, SBRB/T, and SBRC/T), using the same copolymers, but without APTSI.

TABLE III

| Compositions | SBRA | SBRB | SBRC | SBRD | SBRA/T | SBRB/T | SBRC/T |
|---|---|---|---|---|---|---|---|
| Properties in non-vulcanized state | | | | | | | |
| Mooney | 85 | 85 | 70 | 60 | 82 | 82 | 68 |
| Shore A hardness | 64.0 | 64.5 | 66 | 68.5 | 65 | 65 | 66 |
| ME10 | 4.8 | 4.8 | 5.3 | 6.0 | 5.0 | 5.0 | 5.5 |
| ME100 | 1.70 | 1.70 | 1.60 | 1.60 | 1.65 | 1.65 | 1.55 |
| ME300 | 2.10 | 2.15 | 1.85 | 1.80 | 2.00 | 2.03 | 1.80 |
| ME300/ME100 | 1.24 | 1.26 | 1.16 | 1.13 | 1.21 | 1.23 | 1.16 |
| Scott breakage indices at 20° C. | | | | | | | |
| RF | 23 | 23 | 22 | 21 | 22 | 22 | 21 |
| ER % | 550 | 550 | 500 | 500 | 500 | 550 | 500 |
| HL at 60° C.* | 23 | 22 | 29 | 33 | 25 | 24 | 30 |
| Dynamic properties as a function of the deformation | | | | | | | |
| $\Delta G$ at 23° C. | 1.80 | 1.60 | 3.00 | 4.00 | 2.30 | 2.00 | 3.00 |
| tan $\delta$ at 23° C. | 0.18 | 0.17 | 0.24 | 0.27 | 0.21 | 0.19 | 0.24 |

*the deformation for this measurement of hysteresis loss is 35%.

In view of the properties in vulcanized state, it is noted that the addition to the internal mixture of aminopropyltrimethoxysilane confers upon the compositions employing alkoxysilane functionalized SBR A and B greatly improved hysteresis properties, not only as compared with those of composition D employing methanol-stopped SBRD but even with respect to those of composition C employing SBRC functionalized by n-Bu₃SnCl.

It is also noted that while the addition of aminopropyltrimethoxysilane significantly improves the properties of compositions SBR A and B, it has no effect on the properties of composition SBRC in this type of black-silica mixture.

Thus the addition of organosilane agent of general formula I results in an improvement in the hysteresis properties when the carbon black is not the only filler.

EXAMPLE 4

This example shows, on the basis of four tests relative to compositions employing four different organosilane agents, that all of the organosilane agents of general formula I produce compositions having improved properties as compared with those exhibited by the composition SBRD of Example 1.

In this example, Example 2 with SBRB is reproduced identically except that the organosilane agent is methylaminopropyltrimethoxysilane (MAPTSI) of the formula CH₃—HN—(CH₂)₃—Si(OCH₃)3 in test 1, dimethylaminopropyltrimethoxysilane (DMAPTSI) of formula (CH₃)₂N—(CH₂)₃—Si(OCH₃)₃ in test 2, the imidazolinepropyltrimethoxysilane (IMPTSI) of formula:

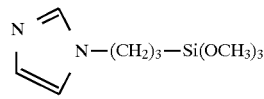

in test 3, and APTSI in test 4. The properties of the four compositions are set forth in Table IV.

TABLE IV

| Test<br>Agent | 1<br>MAPTSI | 2<br>DMAPTSI | 3<br>IMPTSI | 4<br>APTSI |
|---|---|---|---|---|
| Properties in non-vulcanized state | | | | |
| Mooney | 104 | 98 | 88 | 94 |
| Properties in vulcanized state | | | | |
| Shore Hardness | 66.8 | 66.5 | 66.6 | 64.5 |
| ME10 | 5.19 | 5.21 | 5.17 | 5.00 |
| ME100 | 2.31 | 2.15 | 2.18 | 2.08 |
| ME300 | 3.46 | 3.16 | 3.09 | 2.95 |
| ME300/ME100 | 1.50 | 1.47 | 1.42 | 1.42 |
| HL at 60° C.* | 26.5 | 27.4 | 30 | 29 |
| Dynamic properties as a function of the deformation | | | | |
| ΔG at 23° C. | 0.90 | 0.80 | 1.20 | 1.00 |
| tan δ at 23° C. | 0.175 | 0.169 | 0.189 | 0.180 |

(*)the deformation for this measurement of hysteresis loss is 38%.

The results show that the various organosilane agents impart to the compositions hysteresis properties which are greatly improved as compared with those exhibited by composition SBRD of Example 1 and of the same level as those exhibited by composition SBRC of Example 1. The reinforcing properties of the four compositions of the invention are also improved.

Due to their improved hysteresis properties, the compositions in accordance with the invention, when used in a tire in the form of semi-finished products, in particular in the form of treads, make it possible to obtain tires having improved resistance to rolling and therefore make it possible to reduce the consumption of fuel.

I claim:

1. A sulfur-vulcanizable rubber composition comprising at least one diene polymer terminated at one or more termini by an alkoxysilyl radical, carbon black or a mixture of carbon black and silica as reinforcing filler wherein said silica if present is an amount between 1% and 70% inclusive, by weight, of the total reinforcing filler, and at least one organosilane compound having an amine or imine functional group satisfying the general formula I:

$$Z—R^1—Si(OR^2)_{3-n}(R^3)_n$$

in which:

Z represents a primary amine functional group, a cyclic or non-cyclic secondary amine functional group, an imine functional group, or a polyamine functional group; $R^1$, $R^2$, and $R^3$, which may be identical or different, represent an alkyl, aryl, alkaryl or aralkyl radical having from 1 to 12 carbon atoms; n is a whole number selected from among the values of 0, 1, or 2 wherein said alkoxysilyl radical, with which said diene polymer is terminated, is distinct from the organosilane of general formula I and wherein said organosilane of general formula I is present in an amount between 0, 1 and 10 parts, inclusive, by weight to 100 parts of alkoxysilyl radical terminated diene polymers.

2. The composition of claim 1, wherein the radical $R^2$ of the compound of general formula I is a lower alkyl radical having from 1 to 4 carbon atoms.

3. The composition of claim 1, wherein the diene polymer terminated at one or more termini by an alkoxysilyl radical has the general formula II:

$$(Y)—R^5—Si(OR^4)_2—P \qquad (II)$$

in which:

Y represents a halogen, alkyl, epoxy, glycidyloxy, vinyl, or allyl radical; $R^5$ and $R^4$, which are identical or different, represent an alkyl, aryl, alkylaryl or aralkyl radical having from 1 to 12 carbon atoms; and P represents the chain of a diene polymer selected from the group represented by any homopolymer obtained by polymerization of a conjugated diene monomer having from 4 to 12 carbon atoms, or any copolymer obtained by copolymerization of one or more dienes conjugated with each other or with one or more aromatic vinyl compounds having 8 to 20 carbon atoms.

4. The composition of claim 3, wherein (Y)—R⁵—Si(OR⁴)—₂ represents 3-glycidyloxypropyldimethoxysilyl or 2-(3,4(epoxycyclo-hexyl)-ethyldimethoxysilyl.

5. The composition of claim 1, wherein said diene polymer is a butadiene-styrene copolymer or a butadiene-styrene-isoprene copolymer.

6. The composition of claim 1, wherein the carbon black represents all of the reinforcing filler.

7. The composition of claim 1, wherein the reinforcing filler is formed from a mixture of carbon black and silica, the silica representing up to 70% by weight of the total filler.

8. The composition of claim 7, wherein the silica is a highly dispersible precipitated silica having a surface area of 450 m² /g or less as measured by adsorption of cetyl trimethyl ammonium bromide (CTAB).

9. The composition of claim 8, wherein the silica has a BET specific surface area of between 100 and 300 m² /g, both inclusive, and a ratio of BET specific area to CTAB specific surface area of between 1 and 1.2, both inclusive wherein CTAB specific surface area is measured by adsorption of cetyl trimethyl ammonium bromide.

10. A method of preparing a sulfur-vulcanizable rubber composition having a base of diene elastomer which has improved hysteresis properties, comprising a step of incorporating, by thermo-mechanical working, into a diene elastomer terminated at one or more termini by an alkoxysilyl radical, at least one organosilane compound of general formula I:

$$Z\text{—}R^1\text{—}Si(OR^2)_{3-n}\text{—}(R^3)_n \qquad (I)$$

in which:

Z represents a primary amine functional group, a cyclic or non-cyclic secondary amine functional group, an imine functional group or a polyamine functional group; $R^1$, $R^2$, and $R^3$, which are identical or different, represent an alkyl, aryl, alkaryl or aralkyl radical having from 1 to 12 carbon atoms; and n is a whole number selected from among the values of 0, 1, or 2, wherein said alkoxysilyl radical is distinct from said organosilane compound of general formula I, and wherein said organosilane of general formula I is present in an amount between 0.1 and 10 parts, inclusive, by weight, to 100 parts of alkoxysilyl radical terminated diene polymers; and a subsequent step of adding and incorporating at least one component comprising a reinforcing filler, a plasticizer, a pigment, an antioxidant, a lengthening oil, a silica coupling agent, a silica bonding agent, and/or a silica covering agent, wherein silica, if present, is an amount between 1% and 70%, inclusive, by weight, of the total reinforcing filler.

11. The process of claim 10, wherein the organosilane compound of general formula I is placed in the presence of the diene elastomer terminated at one or more termini by an alkoxysilyl radical, wherein said alkoxysilyl radical is distinct from said organosilane compound of general formula I, before any thermo-mechanical work and wherein the organosilane compound of general formula I is then incorporated into the elastomer by the thermo-mechanical working.

12. The process of claim 10, wherein the organosilane compound of general formula I is placed in the presence of the diene elastomer terminated at one or more termini by an alkoxysilyl radical, wherein said alkoxysilyl radical is distinct from said organosilane compound of general formula I after an initial phase of thermo-mechanical working of said diene elastomer, and wherein the organosilane compound of general formula I is incorporated into the elastomer by thermo-mechanical working.

13. The process of claim 10, wherein the elastomer, comprising at least one diene polymer terminated at one or more termini by an alkoxysilyl radical, wherein said alkoxysilyl radical is distinct from the organosilane compound of general formula I, the organosilane of formula I, and the carbon black, is subjected to a first phase of thermo-mechanical working, whereupon at least one component comprising a reinforcing filler, a plasticizer, a pigment, an antioxidant, a lengthening oil, a silica coupling agent, a silica bonding agent, and/or a silica covering agent is added, and wherein the thermo-mechanical working is continued for a suitable period of time.

14. The process of claim 12, wherein the reinforcing filler is formed of carbon black and silica, comprising adding in succession to the elastomer which has undergone an initial phase of thermo-mechanical working, in the following order, the organosilane agent of formula I, then silica and a bonding agent, then a lengthening oil, and finally carbon black with stearic acid and an antioxidizing agent, recovering and cooling the elastomeric block formed, adding and incorporating in a second thermo-mechanical working step at least one component comprising a reinforcing filler, a plasticizer, a pigment, an antioxidant, a lengthening oil, a silica coupling agent, a silica bonding agent, and/or a silica covering agent, recovering the mixture, and in a finishing step, incorporating a vulcanization system and recovering the vulcanizable composition.

15. A tire having improved resistance to rolling, containing a sulfur-vulcanizable rubber composition comprising at least one diene polymer terminated at one or more termini by an alkoxysilyl radical, carbon black or a mixture of carbon black and silica as reinforcing filler, wherein said silica, if present, is present in an amount between 1% and 70%, inclusive, by weight, of the total reinforcing filler, and at least one organosilane compound comprising an amine or imine function having the general formula I:

$$Z\text{—}R^1\text{—}Si(OR^2)_{3-n}(R^3)_n \qquad (I)$$

in which:

Z represents a primary amine functional group, a cyclic or non-cyclic secondary amine functional group or an imine functional group or a polyamine functional group; $R^1$, $R^2$, and $R^3$, which are identical or different, represent an alkyl, aryl, alkaryl or aralkyl radical having from 1 to 12 carbon atoms; and n is a whole number selected from among the values of 0, 1, or 2, wherein the alkoxysilyl radical, with which the diene polymer is terminated is distinct from the organosilane of general formula I, and wherein said organosilane of general formula I is present in an amount between 0.1 and 10 parts, inclusive, by weight, to 100 parts of alkoxysilyl radical terminated diene polymers.

16. (Twice Amended) The tire of claim 15, wherein the tire comprises a tread formed at least in part from the composition.

17. A tire tread comprising a sulfur-vulcanizable rubber composition comprising at least one diene polymer terminated at one or more termini by an alkoxysilyl radical, carbon black or a mixture of carbon black and silica as reinforcing filler, wherein said silica, if present, is present in an amount between 1% and 70% inclusive, by weight, of the total reinforcing filler, and at least one organosilane compound comprising an amine or imine functional group of a general formula I:

$$Z\text{—}R^1\text{—}Si(OR^2)_{3-n}(R^3)_n \qquad (I)$$

in which:

Z represents a primary amine functional group, a cyclic or non-cyclic secondary amine functional group, or an imine functional group, or a polyamine functional group; $R^1$, $R^2$, and $R^3$, which are identical or different, represent an alkyl, aryl, alkaryl or aralkyl radical having from 1 to 12 carbon atoms; and n is a whole number selected from among the values of 0, 1, or 2, wherein the alkoxysilyl radical, with which the diene polymer is terminated is distinct from the organosilane of general formula I, and wherein said organosilane of general formula I is present in an amount between 0.1 and 10 parts, inclusive, by weight, to 100 parts of alkoxysilyl radical terminated diene polymers.

18. The composition according to claim 1, 3, 4, 5, 6, 7, 8, or 9 wherein the radicals $R^1$, $R^2$, and $R^3$, which may be identical or different, each have from one to four carbon atoms.

19. The process according to claim 10, 11, 12, 13, or 14 wherein the radicals $R^1$, $R^2$, and $R^3$, which may be identical or different, each have from one to four carbon atoms.

20. The tire according to claim 15, or 16 wherein the radicals $R^1$, $R^2$, and $R^3$, which may be identical or different, each have from one to four carbon atoms.

21. The tire tread according to claim 17 wherein the radicals $R^1$, $R^2$, and $R^3$, which may be identical or different, each have from one to four carbon atoms.

* * * * *